No. 825,392. PATENTED JULY 10, 1906.
H. J. KEENAN & E. J. TOBIN.
REINFORCED CONCRETE SECTIONAL CONDUIT.
APPLICATION FILED FEB. 23, 1906.
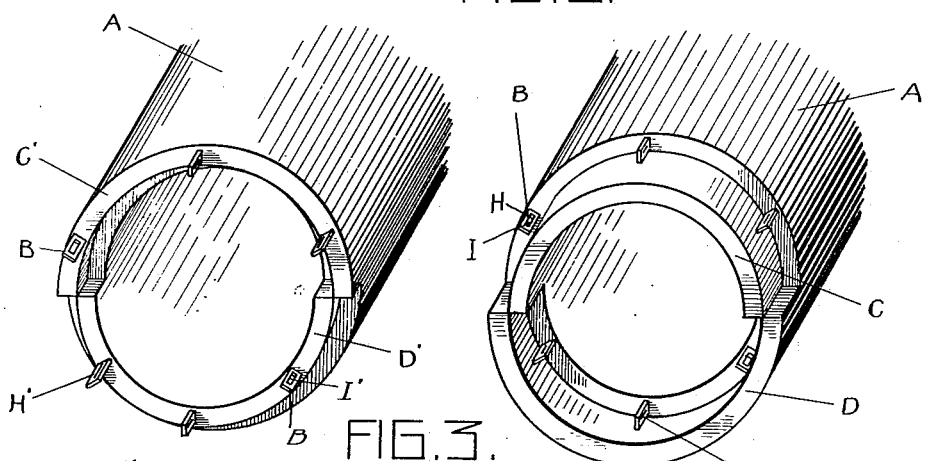
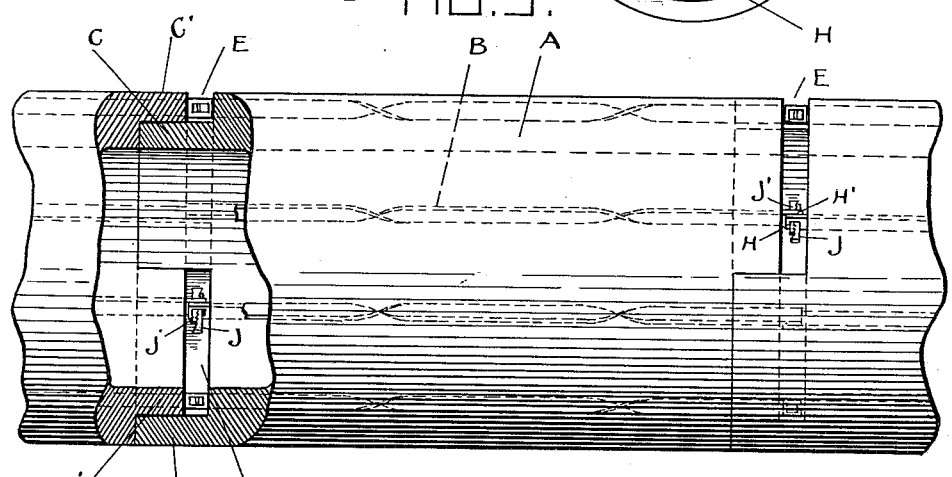
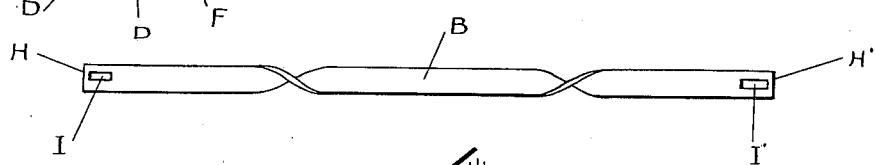
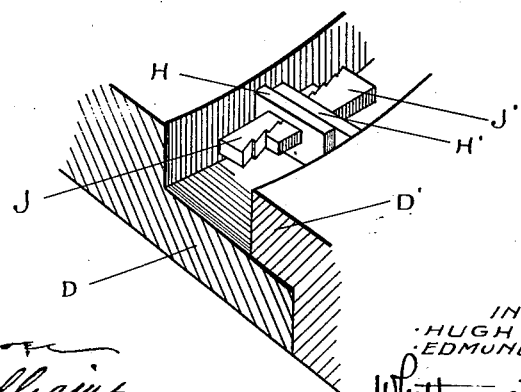
WITNESSES
INVENTORS
HUGH J. KEENAN
EDMUND J. TOBIN
BY
ATT'YS.

UNITED STATES PATENT OFFICE.

HUGH J. KEENAN AND EDMUND J. TOBIN, OF JACKSON, MICHIGAN, ASSIGNORS OF ONE-THIRD TO STEPHEN H. CARROLL, OF JACKSON, MICHIGAN.

REINFORCED CONCRETE SECTIONAL CONDUIT.

No. 825,392.    Specification of Letters Patent.    Patented July 10, 1906.

Application filed February 23, 1906. Serial No. 302,516.

*To all whom it may concern:*

Be it known that we, HUGH J. KEENAN and EDMUND J. TOBIN, citizens of the United States of America, residing at Jackson, in the county of Jackson and State of Michigan, have invented certain new and useful Improvements in Reinforced Concrete Sectional Conduits, of which the following is a specification, reference being had therein to the accompanying drawings.

The invention relates to sectional conduits, such as are employed in the laying of sewers and for similar purposes; and the invention consists, first, in the novel means for drawing and locking the sections in abutting contact with each other, and, further, in the peculiar construction and arrangement of parts, as hereinafter described.

In the drawings, Figure 1 is a perspective view of one end of the conduit. Fig. 2 is a similar view of the opposite end thereof. Fig. 3 is a sectional elevation of a plurality of conduits connected to each other. Fig. 4 is a perspective view showing one of the locking devices, and Fig. 5 is an elevation of one of the reinforcing members for the conduit.

Heretofore sectional conduits have been made in which the adjacent sections have their abutting ends secured to each other by fastening devices. It has been found, however, that in the laying of a large conduit it is impracticable to draw the sections into firm contact with each other, and it has therefore been necessary to depend upon the cement in the joint for rendering the same water-tight. This is inadequate, as after the laying of one section and the sealing of the joint the laying of an adjacent section will often disturb the position of the first, so as to open the joint. In the present invention this difficulty has been overcome, first, by providing means for positively drawing the sections into firm contact with each other, and, second, to arrange the securing devices that those for the lower side of the conduit may be operated from within the same, whereby they are accessible to the workman, as they would not be if arranged on the outside and beneath the conduit.

As illustrated, A is a conduit formed of any suitable material, such as concrete, and preferably reinforced by longitudinally-extending strengthening members B, imbedded therein. The opposite ends of each section of the conduit are formed with segmental flanges C D, adapted to interlock with coöperating flanges C' D' on the opposite end of the section or the end of an adjacent section corresponding thereto. The flanges C D are of greater length than the coöperating flanges C' D', so as to leave segmental grooves E F between the sections when laid. The groove E is formed on the exterior of the conduit and the groove F on the interior thereof, and the former is arranged at the top and the latter at the bottom.

The purpose of the grooves E F is to provide space for the locking devices which are employed for drawing the sections of the conduit in firm contact with each other and for holding them in this position. These locking devices are preferably formed by extensions H H' at opposite ends of the strengthening members B, said extensions being slotted or apertured at I I' to receive locking wedges or keys J J'. Thus when the wedges are inserted in the register-apertures of adjacent extensions H H' of adjacent sections they may be driven in, so as to exert a strong pull upon the adjacent sections to throw same into firm contact with each other. Inasmuch as the groove F is upon the interior of the conduit, the workman has access to the locking devices therein when the said conduit is resting upon the bottom of the ditch. On the other hand, the groove E being upon the outside the upper portion of the conduit is also accessible for operating the locking devices.

In the operation of laying the conduit after the section is placed adjacent to a section already laid and drawn in firm contact therewith by the locking devices the joint may be sealed by placing cement in the grooves E F. The cement in these grooves performs the double function of sealing the joint to render it water-tight and also of embedding the locking devices, so that they cannot become loosened. Furthermore, the groove F being on the bottom of the interior of the conduit and the groove E on the upper side of the top of the conduit the cement in each will be prevented from running out.

The arrangement of the groove F upon the interior and bottom side of the conduit is also useful in that it enables the flushing up of the joint where there are any variations in thickness of the engaging ends of the sections or where one section is slightly higher than the other. In either case the cement in the groove may be leveled off, so as to form a smooth connection without a shoulder upon which sediment may lodge.

What we claim as our invention is—

1. In a sectional conduit, the combination with abutting sections, of means for locking said sections together, said sections and locking means being constructed and arranged to permit the latter to be operated from the interior of the conduit.

2. In a sectional conduit, the combination with abutting sections, of means arranged outside of the inner face of the conduit for locking said sections together, said sections and locking means being constructed and arranged to permit the latter to be operated from within the interior of the concrete.

3. In a sectional conduit the combination of abutting sections formed with a recess opening into the interior of the conduit adjacent to the joint, and a locking device for said sections within said recess.

4. In a sectional conduit the combination of abutting sections formed with a groove or recess opening into the interior of said conduit and upon the lower side thereof adjacent to the joint, and locking devices within said groove or recess.

5. In a sectional conduit the combination with sections having their ends fashioned to interlock with internal and external grooves adjacent to the joint respectively on the lower and upper sides of the conduit and locking devices located in said grooves upon opposite sides of the conduit.

6. A sectional conduit comprising sections formed with a cement body and longitudinally-extending metallic strengthening members embedded therein, the ends of said sections being fashioned with interlocking flanges, leaving grooves on the interior and exterior of the conduit respectively on the lower and upper sides thereof, and the ends of said metallic strengthening members constituting securing devices located in said grooves.

In testimony whereof we affix our signatures in presence of two witnesses.

HUGH J. KEENAN.
EDMUND J. TOBIN.

Witnesses:
JAMES P. BARRY,
AMELIA WILLIAMS.